United States Patent
Park

(10) Patent No.: US 6,813,662 B2
(45) Date of Patent: Nov. 2, 2004

(54) MEMORY DRIVE HAVING MULTI-CONNECTOR AND METHOD OF CONTROLLING THE SAME

(75) Inventor: Hee-chun Park, Suwon (KR)

(73) Assignee: Samsung Electronics Co., Ltd, Suwon-Si (KR)

(*) Notice: Subject to any disclaimer, the term of this patent is extended or adjusted under 35 U.S.C. 154(b) by 0 days.

(21) Appl. No.: 10/361,693

(22) Filed: Feb. 11, 2003

(65) Prior Publication Data

US 2003/0236934 A1 Dec. 25, 2003

(30) Foreign Application Priority Data

Jun. 25, 2002 (KR) .................................. 2002-35778

(51) Int. Cl.[7] .............................................. G06F 13/14
(52) U.S. Cl. .......................... 710/74; 710/8; 710/300; 710/301; 711/115
(58) Field of Search .................... 710/8, 74, 300, 710/301; 711/115

(56) References Cited

U.S. PATENT DOCUMENTS

| | | | | |
|---|---|---|---|---|
| 6,088,755 A | * | 7/2000 | Kobayashi et al. | ......... 710/300 |
| 6,344,793 B1 | | 2/2002 | Geck et al. | |
| 6,385,677 B1 | * | 5/2002 | Yao | .............................. 711/115 |
| 6,460,094 B1 | * | 10/2002 | Hanson et al. | .................. 710/8 |
| 6,625,790 B1 | * | 9/2003 | Casebolt et al. | ................ 716/8 |
| 6,658,516 B2 | * | 12/2003 | Yao | .............................. 710/301 |

FOREIGN PATENT DOCUMENTS

| | | |
|---|---|---|
| JP | 2001-102136 | 4/2001 |
| KR | 20-203512 | 9/2000 |
| KR | 2001-19355 | 3/2001 |
| KR | 2001-36745 | 5/2001 |
| KR | 2001-62726 | 7/2001 |
| KR | 2001-95472 | 11/2001 |

\* cited by examiner

*Primary Examiner*—A. Elamin
(74) *Attorney, Agent, or Firm*—Staas & Halsey LLP

(57) ABSTRACT

A portable memory drive having a multi-connector, including a plurality of connectors different in type, receiving data from and transmitting data to an electronic device; a memory storing therein the data inputted from the electronic device; a controller storing the data received through the connector connected to the electronic device in the memory, reading out the data stored in the memory and providing the data to the electronic device through the connector connected to the electronic device. With this configuration, a memory drive having a multi-connector with which the memory drive can be directly connected to various ports provided in an electronic device, without other separate connections.

21 Claims, 6 Drawing Sheets

MEMORY DRIVE HAVING MULTI-CONNECTOR AND METHOD OF CONTROLLING THE SAME

CROSS-REFERENCE TO RELATED APPLICATION

This application claims the benefit of Korean Application No. 2002-35778, filed Jun. 25, 2002, in the Korean Intellectual Property Office, the disclosure of which is incorporated herein by reference.

BACKGROUND OF THE INVENTION

1. Field of the Invention

The present invention relates to a memory drive having a multi-connector and a method of controlling the same, and more particularly, to a memory drive having a multi-connector, in which compatibility of the memory drive connected to electronic devices is improved by providing different types of connectors in the memory drive.

2. Description of the Related Art

A storage device generally called a memory drive or a memory disk is a new storage interface, which can replace conventional storage devices.

The memory drive is a storage device in which a comparatively large volume of data in a range between 8 MB to 256 MB can be stored, and the memory drive can be conveniently updated. Further, the memory drive does not require any additional drive and the memory drive is capable of being connected to electronic devices such as a digital camera, a personal digital assistant (PDA), a cellular phone, as well as a computer, to thereby store data therein.

The memory drive supports most of universal serial bus (USB) interfaces. The USB interface refers to a standard unifying specifications of data interfaces developed for conveniently connecting peripheral devices such as printers, mouses, keyboards, etc. to a computer. Depending on positions and numbers of pins, and sizes of ports thereof, the USB ports are classified into an A-type USB port, a B-type USB port, and a 5 pin mini B-type USB port, a 4 pin mini-B type USB port and so on.

FIGS. 5A and 5B show an A-type USB port and a mini B-type USB port, respectively. As shown in FIGS. 5A and 5B, a USB port is generally comprised of 4 pins, including a 5V power source pin, +data, −data and ground (GND). The A-type USB port is applied to a computer, the mini B-type USB port is applied to portable electronic devices such as digital cameras. These USB ports are both identical in kinds of signals inputted or outputted through each pin but are different in sizes of the ports. The A-type USB port is used in the computer, but in portable electronic devices having a relatively small and limited space, the mini B-type USB port is used, having a reduced size compared to the A-type USB port.

In the case of a conventional memory drive, the conventional memory drive comprises an A-type USB connector by which the conventional memory drive is connectable to the A-type USB port provided in the computer. Thus, in the case of communicating data between portable electronic devices such as the digital cameras and the conventional memory drive, the conventional memory drive cannot be directly connected to the mini B-type USB port of portable electronic devices. In order to connect the conventional memory drive to the portable electronic devices, a cable is used, the cable having an A-type USB port for connection to the memory drive provided in one end thereof and a mini B-type connector for connection to the portable electronic devices provided in another end thereof.

Where the connector provided in the conventional memory drive is dissimilar in type to the port provided in the electronic device, an additional cable is required, thereby causing inconvenience to a user.

SUMMARY OF THE INVENTION

Accordingly, a memory drive enabling an easy connection to a variety of electronic devices is provided.

The above and other objects of the present invention are achieved by providing a memory drive having a multi-connector, comprising a plurality of connectors different in type, to receive data from and transmit data to an electronic device; a memory storing therein the data inputted from the electronic device; a controller storing the data received through the connector connected to the electronic device in the memory, reading out the data stored in the memory and providing the data to the electronic device through the connector connected to the electronic device.

Additional objects and advantages of the invention will be set forth in part in the description which follows and, in part, will be obvious from the description, or may be learned by practice of the invention.

The memory drive having a multi-connector further comprises a plurality of switches corresponding to a plurality of connectors, switching signals inputted and outputted through the plurality of connectors; wherein a controller controls the switches so that the data is prevented from being inputted and outputted through any other connectors except for one predetermined connector, where at least two connectors connect an electronic device.

According to another aspect a method of controlling a portable memory drive having a multi-connector, comprises preparing a plurality of connectors different in type for data reception from and transmission to an electronic device; determining whether at least two connectors are connected to the electronic device when power is supplied; preventing input and output of data through any other connectors except for one predetermined connector, where the at least two connectors are determined to be connected to the electronic device; and processing the data inputted and outputted through the one predetermined connector.

If only one of the at least two connectors is determined to be connected to the electronic device, the data inputted and outputted through the connector currently in connection is processed.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
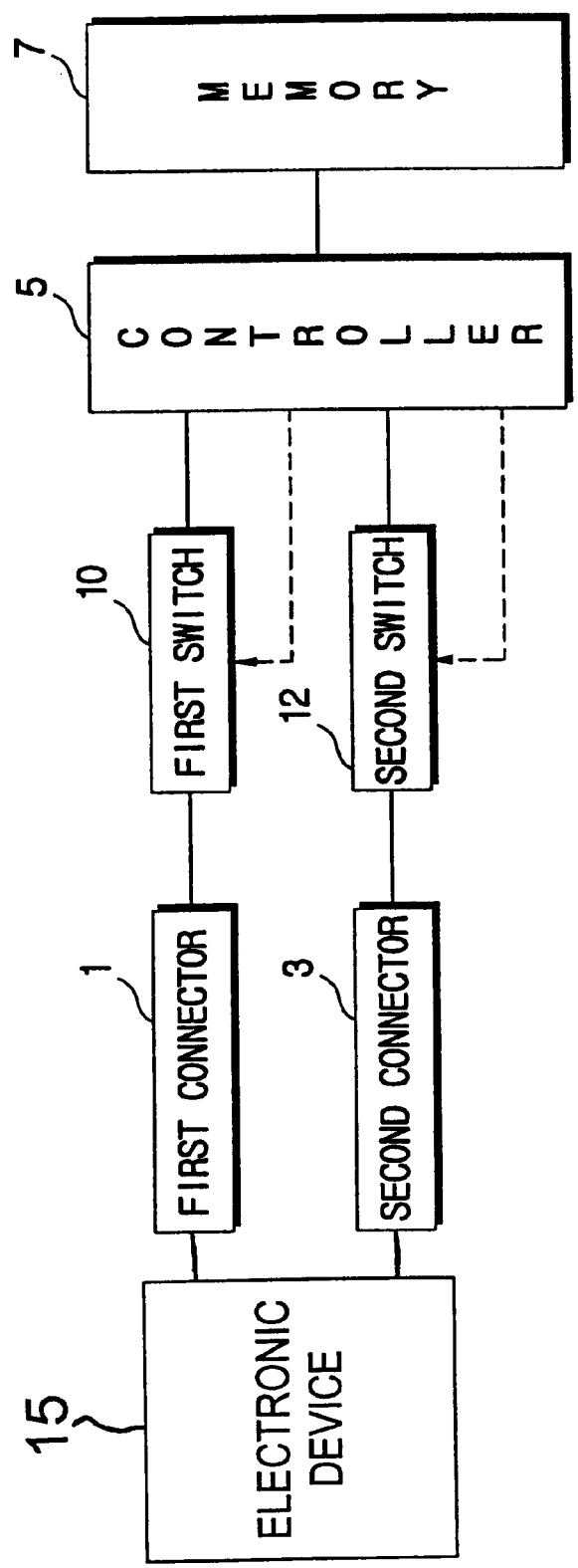
FIG. 1 is a block diagram of a memory drive according to an embodiment of the present invention.

Reference will now be made in detail to the present preferred embodiments of the present invention, examples of which are illustrated in the accompanying drawings wherein like reference numerals refer to the like elements throughout. The embodiments are described below in order to explain the present invention by referring to the figures.

FIG. 1 is a block diagram of a memory drive according to an embodiment of the present invention. As shown in FIG. 1, the memory drive comprises a first connector 1 connecting to an outside electronic device 15, a second connector 3 different in type from the first connector 1, a first switch 10 and a second switch 12 corresponding with the respective connectors, switching input and output signals through the connectors, a memory 7 storing therein data inputted from the outside, a controller 5 storing data inputted from each connector in the memory 7, providing the data stored in the memory 7 to the outside device through the connectors, and controlling operations of the switches 10 and 12.

The first connector 1 and the second connector 3 are used to connect to the ports provided in the electronic device 15, which may employ an A-type USB connector, a B-type USB connector, a 5-pin mini B-type USB connector, a 4-pin mini B-type USB connector, etc., all of which support the USB interface. In addition, the memory drive can employ other connectors that support other interfaces applicable to the memory drive, for example, an IEEE1394 connector supporting an IEEE1394 interface in addition to the USB interface. The first connector 1 and the second connector 3 are different in type. Thus, a user may directly connect the memory drive to the ports of the electronic device 15, which are appropriate for kinds of the ports provided in the electronic device 15.

The first switch 10 and the second switch 12 switch input and output signals through the first connector 1 and the second connector 3 respectively, and the first switch 10 and the second switch 12 are controlled by the controller 5.

The controller 5 stores data inputted through the connectors 1 and 3 in the memory 7, or transmits the data to the electronic device 15 connected to the connectors 1 and 3. The controller 5 controls the first switch 10 and the second switch 12 so as to switch input and output signals through the connectors 1 and 3, thereby to allow signals inputted through only one of the connectors 1 or 3 to be processed, where both of the connectors 1 and 3 are respectively connected to the electronic device 15. The priority of the connectors 1 and 3 may be predetermined.

With this configuration, the user connects the connectors 1 and 3 corresponding to the ports of the electronic device 15, thereby to allow the data stored in the electronic device 15 to be stored in the memory 7. Even in the case that both connectors 1 and 3 are connected simultaneously, the memory drive is operable in a regular manner.

The memory drive having two different connectors 1 and 3 has been illustrated, but to provide three or more different connectors to the memory drive is also possible. In this case, respective switches will be added, corresponding to each added connector. The controller 5 will be designed so as to perform a control function according to an interface applied to each connector.

Figure 2:
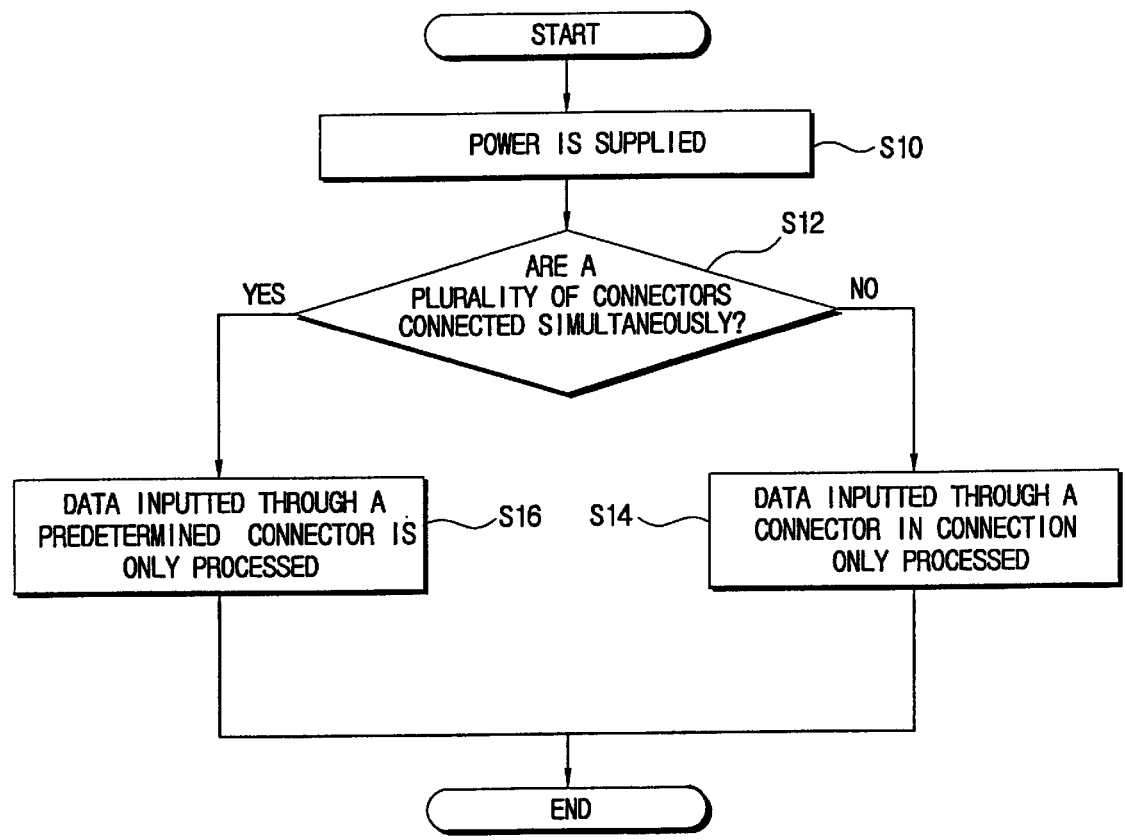
FIG. 2 is a flow chart of the memory drive according to FIG. 1.

In the case of a memory drive employing a plurality of connectors, the control flow of the controller 5 is as shown in FIG. 2. If the memory drive using a plurality of connectors is connected to an electronic device 15 and power is supplied to the electronic device 15 at operation S10, the controller 5 determines whether a plurality of connectors are all connected to the electronic device 15 at operation S12. If only one of the connectors is determined to be connected, the controller 5 processes data inputted through the connector currently in connection at operation S14. If at least two connectors are connected to the electronic device 15, the controller 5 controls switches corresponding to the connectors except for one of the connectors, according to a predetermined priority of the connectors to be turned off, and processes the data inputted through the one pre-determined connector at operation S16.

Figure 3:
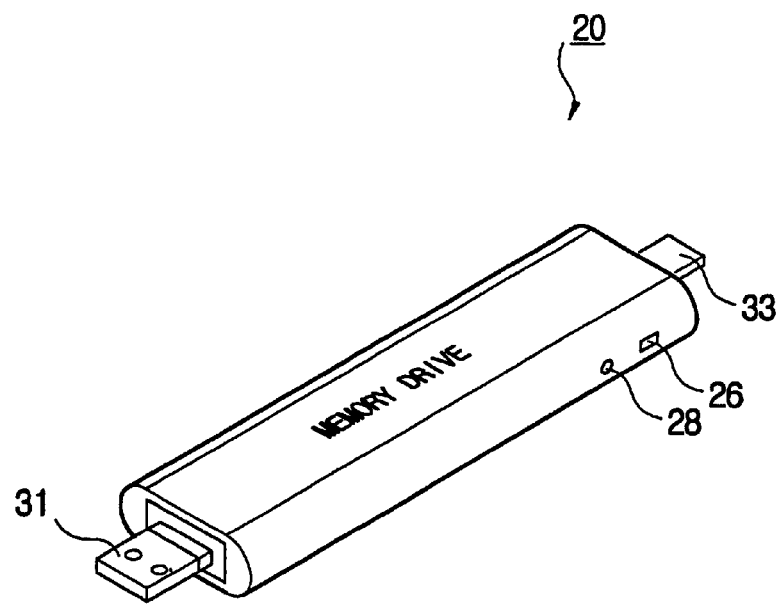
FIG. 3 is a perspective view of a memory drive according to one embodiment of the present invention.

FIG. 3 is a perspective view of a memory drive 20 according to one embodiment of the present invention. As depicted therein, the memory drive 20 comprises a bar-shaped body, having an A-type USB connector 31 connected to one end thereof and a mini B-type USB connector 33 connected to the other end thereof.

In the bar-shaped body are provided an LED 28 to indicate operation or non-operation of the memory drive 20 and a write protecting switch 26.

Figure 5A:
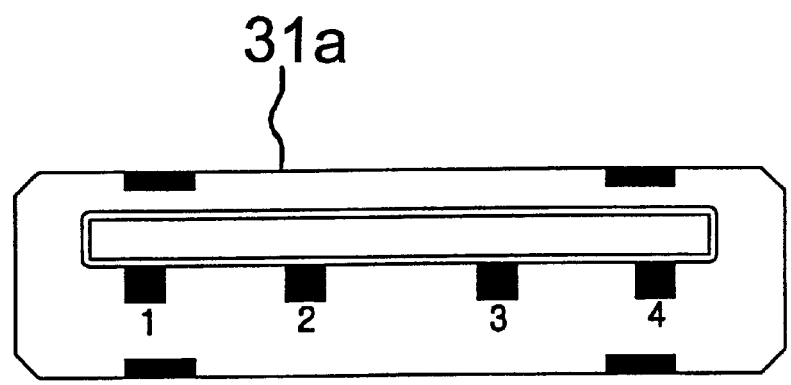
FIGS. 5A and 5B are top plan views of USB ports, respectively.
Figure 5B:
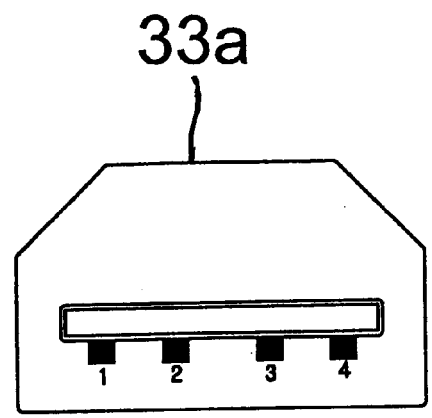

The A-type USB connector 31 is to connect to a USB port provided in the computer, and the mini B-type USB connector 33 is to connect to a USB port having a comparatively smaller size than the A-type USB port 31a, as shown in FIG. 5A.

With this configuration, the memory drive 20 is connectable to the computer by the A-type USB connector 31 to store data which is also stored in a computer, in the memory drive 20 for backup, the memory drive 20 can be connected to the computer by the A-type USB connector 31. In the case of the memory drive 20 storing data of a portable electronic device 15 such as a digital camera for backup, the memory drive 20 can be directly connected to the portable electronic device 15 by the mini B-type USB connector 33.

Figure 4:
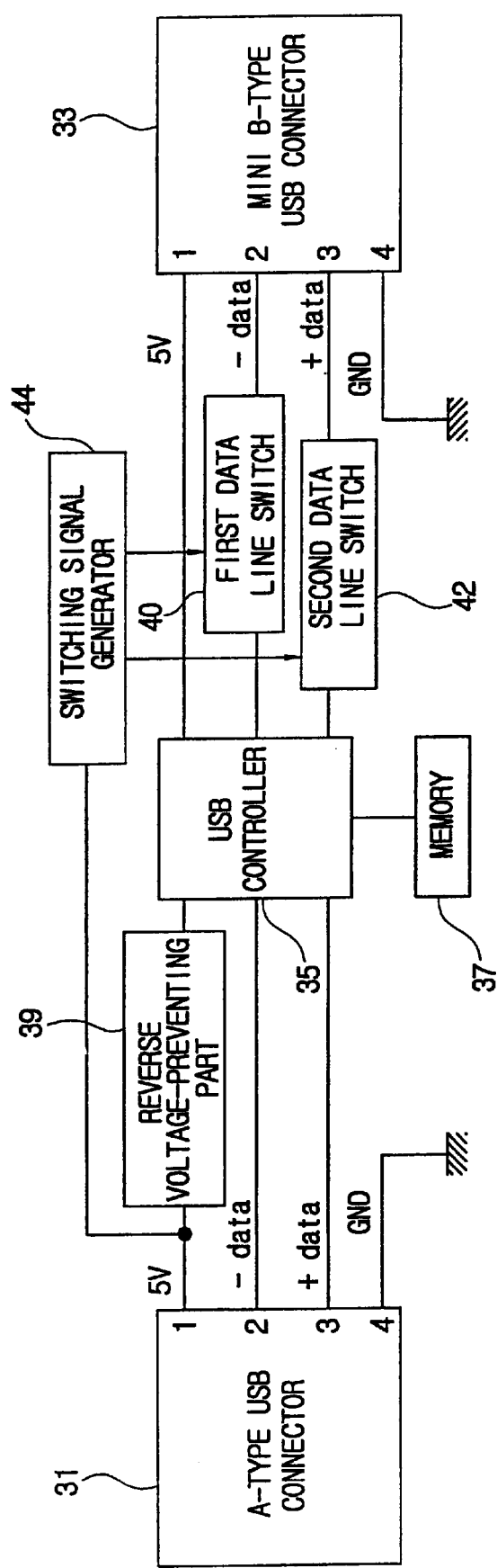
FIG. 4 is a block diagram of the memory drive shown in FIG. 3.

A control block diagram of the memory drive 20 is shown in FIG. 4. As illustrated in FIG. 4, the memory drive 20 comprises a memory 37 storing data therein, an A-type USB connector 31 and a mini B-type USB connector 33, a first data line switch 40 and a second data line switch 42 switching data signals from the mini B-type USB connector 33, a switching signal generator 44 supplying control signals to the respective switches 40 and 42 according to a power input signal from a power line, a reverse voltage-preventing part 39, and a USB controller 35 performing a control function to store or read out data according to the signal inputted through one or more of the A-type USB and mini B-type USB connectors 31 and 33. The reverse voltage-preventing part 39 is placed on a power input line of one of the A-type USB connector 31 and the mini B-type USB connector 33 and is used to prevent reverse voltage. The power input line for the reverse voltage-preventing part 39 is selected according to one of A-type USB connector 31 and the mini B-type USB connector 33 having priority. Hereinbelow, the present embodiment will be disclosed on the assumption that the A-type USB connector 31 has priority.

The A-type USB connector 31 and the mini B-type USB connector 33 support a USB interface, and have pins which perform a same function but the A-type USB and mini B-type USB connectors 31 and 33 are different in size. Each of the A-type USB connector 31 and the mini B-type USB connector 33 includes four pins. Of the four pins, pin 1 receives an input of 5V from an electronic device 15, pins 2 and 3 receive inputs of a –data signal and a +data signal, respectively, and pin 4 provides a reference signal potential GND.

The reverse voltage-preventing part 39 prevents the 5V inputted through the mini B-type USB connector 33 from flowing backward to the A-type USB connector 31, where the A-type USB connector 31 and the mini B-type USB connector 33 are both connected to the electronic device 15.

The first data line switch 40 and the second data line switch 42 switch the data inputted from the pin 1 and the pin 2 of the mini B-type USB connector 33. The pin 1 and the pin 2 of the mini B-type USB connector 33 are pins through which the −data signal and the +data signal pin are inputted. Thus, where each of the switches 40 and 42 is turned on, the data inputted through the mini B-type USB connector 33 is regularly transmitted to the USB controller 35. However, where each of the first and second data line switches 40 and 42 is turned off, data is not transmitted to the memory drive 20 even if the memory drive 20 is connected to the electronic device 15 through the mini B-type USB connector 33.

The switch signal generator 44 is provided in the power line branched from a 5V line of the A-type USB connector 31 and the mini B-type USB connector 33. Where 5V is inputted from both of the A-type USB and mini B-type USB connectors 31 and 33, a switching signal is applied to the first data line switch 40 and the second data line switch 42, to thereby turn off the first and second data line switches 40 and 42. Thus, when the A-type USB connector 31 and the mini B-type USB connector 33 are both connected, the data signal inputted through the mini B-type USB connector 33 is switched off, and only the data signal inputted through the A-type USB connector 31 is transmitted to the USB controller 35.

The USB controller 35 stores the data inputted through each of the A-type USB and mini B-type USB connectors 31 and 33 in the memory 37 or provides the data stored in the memory 37 to the electronic device 15 through one or more of the A-type USB and mini B-type USB connectors 31 and 33. The USB controller 35 can perform a plurality of control functions including compression of the data, allotment of memory, exchange of messages, scheduling of work time as well as input/output management of the data.

With this configuration, the user can use the memory drive 20 by directly connecting the memory drive 20 to a portable electronic device 15 having a mini B-type USB port 33a, without an additional cable, as well as a computer body having an A-type USB port 31a.

Where the A-type USB connector 31 and the mini B-type USB connector 33 are both connected to the electronic device 15, the data signal inputted through the mini B-type USB connector 33 can be switched off and only the data signal inputted through the A-type USB connector 31 can be processed. Where both of the A-type USB and mini B-type USB connectors 31 and 33 are connected to the electronic device 15, an effective connector can be previously designated according to a designing method thereof.

A memory drive having two connectors is provided. Further, the memory drive is not limited in a number of connectors and in types of connectors, which are replaceable by a B-type USB connector, a 5-pin mini B-type USB connector and so on. Further, a connector may be employed in an IEEE1394 interface rather than an USB interface.

A switching control signal to switch data is supplied from a switching signal generator; however, the switching control signal to be applied may be from the USB controller, by changing a control program or a circuit design of a conventional USB controller.

The memory drive has a plurality of connectors different in type, allowing a user to directly connect the memory drive to various ports provided in an electronic device, without other connections such as a cable. Accordingly, the memory drive assures easy connection to the electronic device, thereby improving compatibility and usability of the memory device with other devices.

When a plurality of connectors are all simultaneously connected, a switch to switch signals from each connector may be provided, so as to process only the data inputted through a predetermined connector, thereby enabling a normal operation of the memory drive.

A memory drive allowing an easy connection to a variety of electronic devices is provided.

Although a few preferred embodiments of the present invention have been shown and described, it would be appreciated by those skilled in the art that changes may be made in this embodiment without departing from the principle and spirit of the invention, the scope of which is defined in the claims and their equivalents.

What is claimed is:

1. A memory drive for connection with a plurality of electronic devices, comprising:

a multi-connector including a plurality of connectors, each of the plurality of connectors of the multi-connector having plural conductors and being different in type to receive data from and transmit data to one of the plurality of electronic devices;

a memory storing therein the data received from the electronic device; and a controller storing in the memory the data received through the multi-connector connected to the electronic device, reading out the data stored in the memory and providing the data to the electronic device through only one of the plurality of connectors connected to the electronic device.

2. The memory drive having a multi-connector according to claim 1, further comprising:

a plurality of switches corresponding to the plurality of connectors, switching signals inputted and outputted through the plurality of connectors;

wherein the controller controls the plurality of switches so that data is prevented from being inputted and outputted through other connectors except for one predetermined connector, where at least two connectors of the plurality of connectors connect the electronic device.

3. The memory drive according to claim 1, wherein the multi-connector includes at least two of an A-type USB connector, a B-type USB connector, a 5-pin mini B-type USB connector, and a 4-pin mini-USB connector.

4. The memory drive according to claim 1, wherein when two or more of the plurality of connectors are simultaneously connected to the electronic device, the one connector to be used to input and output the data from the memory is determined according to a predetermined priority.

5. The memory drive according to claim 1, further comprising:

an LED to indicate an operational state of the memory drive.

6. The memory drive according to claim 1, further comprising:

a write protection switch to write protect the memory drive.

7. The memory drive according to claim 1, further comprising:

one or more reverse voltage-preventing parts connected between one or more corresponding connectors of the plurality of connectors and the controller to prevent a voltage inputted on the one or more corresponding connectors from the external device from energizing another connector of the one or more corresponding connectors.

8. The memory drive according to claim 1, wherein:

the in-line switches switch signals through the plurality of connectors; and a switching signal generator to switch the in-line switches such that the data is only transmitted through one connector of the plurality of connectors, where at least two connectors of the plurality of connectors connect the electronic device.

9. A method of controlling a portable memory drive having a multi-connector for connection with a plurality of electronic devices, comprising:

preparing a plurality of connectors different in type for data reception from and transmission to one of the plurality of electronic devices;

determining whether at least two connectors of the plurality of connectors are connected to the electronic device when power is supplied;

preventing input and output of data through other connectors except for one predetermined connector of the plurality of connectors, when the at least two connectors are determined to be connected to the electronic device; and processing the data inputted and outputted through the one predetermined connector.

10. The method according to claim 9, wherein if only one of the plurality of connectors is determined to be connected to the electronic device, the data inputted and outputted through the one connector determined to be connected is processed.

11. A method of controlling a memory drive having a multi-connector with a plurality of different types of connectors, each of which is connected to one of plural electronic devices, comprising:

receiving and/or transmitting data from the memory drive to the electronic device through the multi-connector;

if at least two connectors of the plurality of connectors are connected to the electronic device when power is supplied to the electronic device, then preventing input data and/or output data through any of the connectors of the plurality of connectors except for one predetermined connector of the plurality of connectors; and if one connector of the plurality of connectors is connected to the electronic device when power is supplied to the electronic device, then processing input data and/or output data through the one connector of the plurality of connectors.

12. The method of controlling a memory drive according to claim 11, wherein said preventing comprises:

switching signals inputted and outputted through the at least two connectors of the plurality of connectors by controlling a plurality of switches so that the signals are prevented from being inputted and outputted through any of the connectors of the plurality of connectors except for one predetermined connector of the plurality of connectors.

13. The method of controlling a memory drive according to claim 12, wherein said switching includes determining the one predetermined connector according to a predetermined priority.

14. The method of controlling a memory drive according to claim 11, further comprising:

indicating an operational state of the memory drive.

15. The method of controlling a memory drive according to claim 11, further comprising:

write protecting the memory drive.

16. The method of controlling a memory drive according to claim 11, further comprising:

preventing a voltage inputted on the one or more corresponding connectors from energizing another connector of the one or more corresponding connectors.

17. The memory drive according to claim 11, further comprising:

switching signals transmitted through the plurality of connectors by a plurality of switches corresponding to the plurality of connectors; and only transmitting data through one connector of the plurality of connectors, when at least two connectors of the plurality of connectors connect the electronic device.

18. A method of controlling a memory drive having a multi-connector with a plurality of different types of connectors, each of which is connected to plurality of electronic devices, comprising:

receiving and/or transmitting data from the memory drive to the electronic device through the multi-connector;

if at least two connectors of the plurality of connectors are connected to the electronic device when power is supplied to the electronic device, then processing input data and/or output data through only one predetermined connector of the at least two connectors; and if one connector of the plurality of connectors is connected to the electronic device when power is supplied to the electronic device, then processing input data and/or output data through the one connector of the plurality of connectors.

19. A memory drive having a multi-connector for connection with a plurality of electronic devices, comprising:

a plurality of connectors of the multi-connector different in type, each of the plurality of connectors including at least one data line to receive data from and transmit data to one of the plurality of electronic devices, each of the data lines including an in-line switch to allow electrical disconnection of the electronic device from the memory drive when the memory drive is coupled with the electronic device;

a memory storing therein the data received from the electronic device; and a controller storing in the memory the data received through the multi-connector connected with the electronic device, reading out the data stored in the memory and providing the data to the electronic device through only one of the plurality of connectors connected with the electronic device.

20. The memory drive according to claim 19, wherein:

the in-line switches switch signals inputted and outputted through the plurality of connectors; and the controller controls the in-line switches so that data is prevented from being inputted and outputted through other connectors except for one predetermined connector, where at least two connectors of the plurality of connectors connect the electronic device.

21. The memory drive according to claim 19, wherein:

the in-line switches switch signals through the plurality of connectors; and a switching signal generator to switch the in-line switches such that the data is only transmitted through one connector of the plurality of connectors, where at least two connectors of the plurality of connectors connect the electronic device.

* * * * *

UNITED STATES PATENT AND TRADEMARK OFFICE
CERTIFICATE OF CORRECTION

PATENT NO.    : 6,813,662 B2
DATED         : November 2, 2004
INVENTOR(S)   : Hee-chun Park It is certified that error appears in the above-identified patent and that said Letters Patent is hereby corrected as shown below:

<u>Title page,</u>
Item [56], References Cited, U.S. PATENT DOCUMENTS, change "2/2002 Geck et al." to -- 1/2002 Amoni et al. --.
FOREIGN PATENT DOCUMENTS, change "KR 2001-36745" to -- 2001-36746 --.

<u>Column 8,</u>
Line 12, change "each of which is connected to" to -- each of which is connected to a --.

Signed and Sealed this

Twenty-first Day of June, 2005

JON W. DUDAS
*Director of the United States Patent and Trademark Office*